Patented Mar. 19, 1940

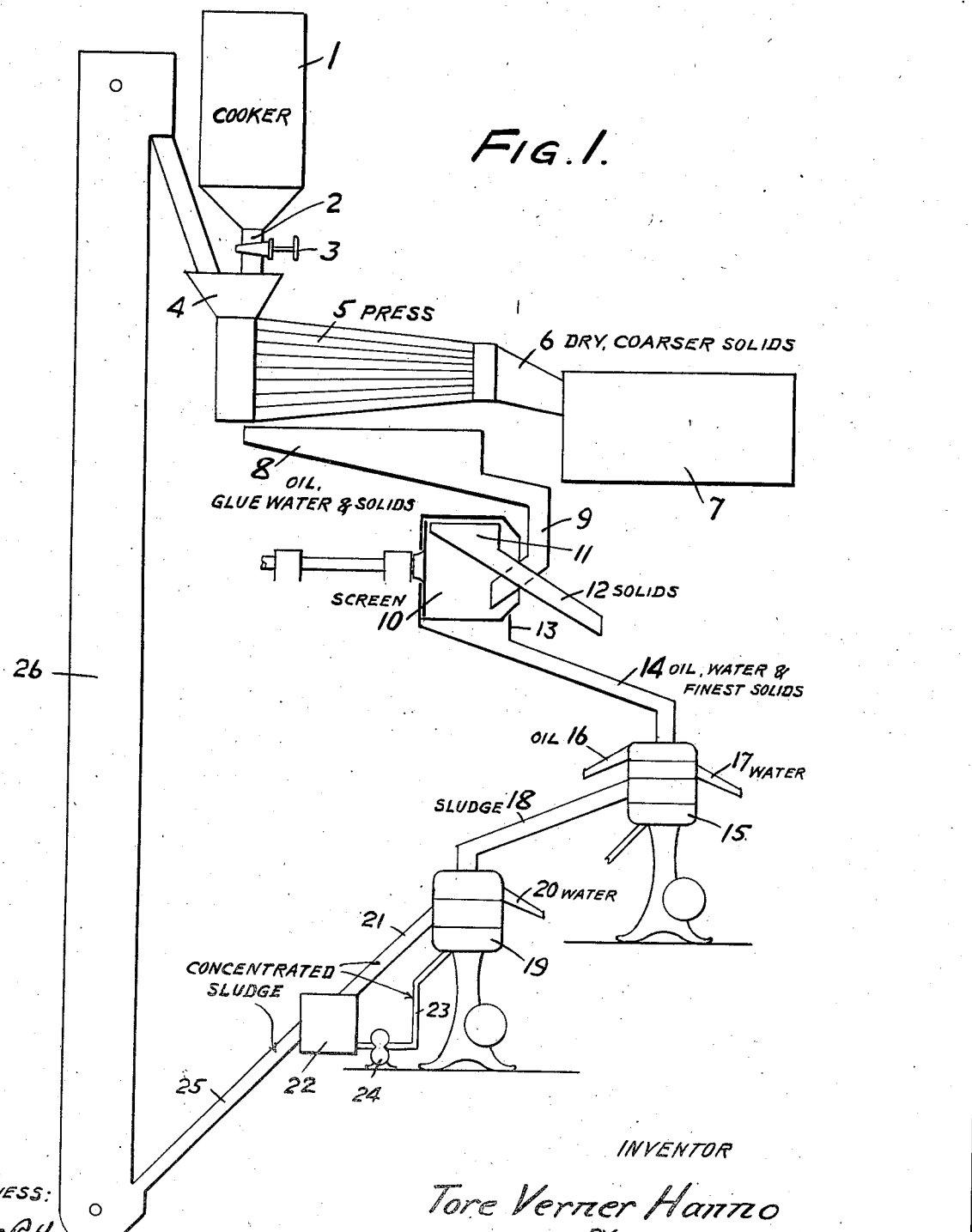

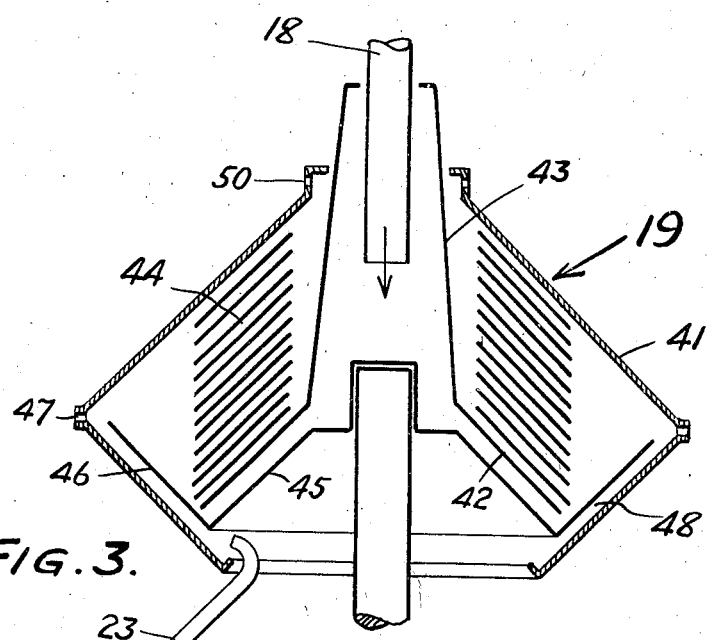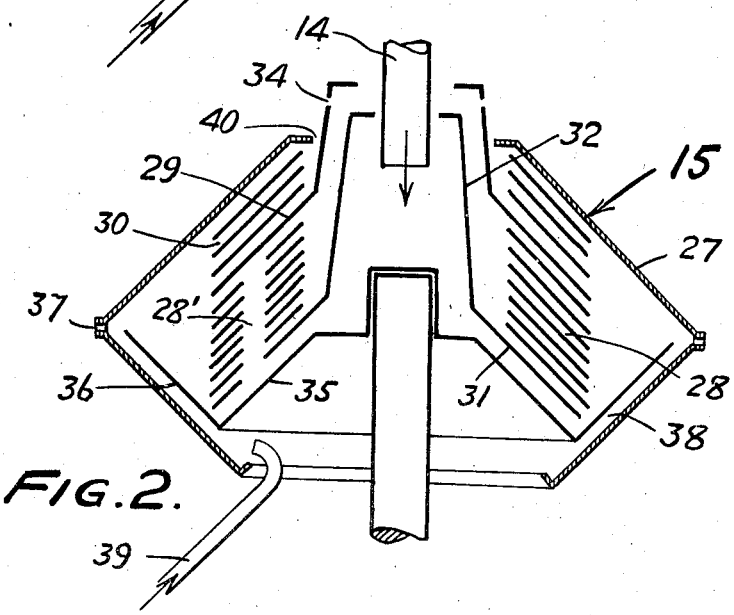

2,193,871

UNITED STATES PATENT OFFICE 2,193,871

PROCESS FOR SEPARATING SOLIDS FROM ANIMAL RAW MATERIAL

Tore Verner Hanno, Stockholm, Sweden, assignor to The De Laval Separator Company, New York, N. Y., a corporation of New Jersey Application August 5, 1938, Serial No. 223,225
In Norway September 2, 1937

8 Claims. (Cl. 99—2)

From products obtained by boiling animal raw material it is known to extract oil and solid matters, for instance fish-meal, by subjecting the material, after boiling, to pressure to separate a so-called press-liquid and a press-cake, drying the press-cake, subjecting the press-liquid to pre-cleaning by gravity settling, and then separating or clarifying the pre-cleaned liquid by means of centrifuges. In order to obtain an oil of satisfactory quality, it is necessary that the gravity settling should not be too long, because changes quickly occur in the press-liquid which entail a reduction in the quality of the oil. On the other hand, gravity settling necessitates that the press-liquid shall be subjected to a sufficiently long decanting in order to enable the centrifugal separation to be efficient. Owing to these contradictory conditions, the process has been practiced commercially to only a limited extent. The use of rotating strainers, so constructed that all particles over a given dimension contained in the liquid are strained off, is also known; but this method, also has been found to be objectionable, because any strainer which is adapted to effect removal of the majority of solids must have very fine meshes and is therefore easily clogged.

The present invention is a process for the recovery of the majority of the solid matter from glue water and has certain characteristic features which will now be described.

The raw material is pre-treated by heating and pressing in such a way that the oil becomes sufficiently free from cellular tissue. From the press, or directly from the cooker if a press is not used, the mass is passed through a strainer in which only the coarsest impurities are removed. The liquid leaving the strainer is fed into a continuous operation centrifugal separator, from which the solid matters and part of the glue water discharge through openings positioned in the circumferential wall of the bowl and the remainder of the glue water through an outlet or outlets at a smaller distance from the center, while the oil discharges through outlets which are located still closer to the center. Generally the concentrate of solids and glue water discharging through the peripherical openings is not sufficiently high to enable economic extraction of the solids. According to the present invention, the concentration of the solids may be increased by introducing so much solid matter, or glue water or other liquid containing a high concentration of solids, into the centrifugal bowl, for instance, in the neighborhood of the peripherical openings, that the concentration becomes sufficiently high. In such a case it is advisable to feed back into the bowl some concentrate already discharged. It is, however, generally better to subject the concentrate of solids and glue water which is obtained from the above separators to a further concentration by separation, preferably, in another continuous operation centrifugal separator in which the solid matters, with a suitable amount of liquid, discharge together through openings located in the circumference of the bowl, and to increase in this separation, instead of in the former one, the concentration by feeding back some concentrate obtained in this second separation into the bowl. The excess of the glue water liberated from solids then discharges through outlets positioned closer to the center. I have found that in this way it is possible to increase the concentration of the solids to over 60% wet sludge or more than 25% dry solids.

I have further found that if it is possible to get a product containing more than 20% dry solids, it is economically advantageous to re-introduce this product at some stage of the hereinbefore described process. Thereby the majority of the solids contained in the liquid can be extracted. Thus, the product may be re-introduced—

1. Into the continuous press, the sludge-containing water being admixed with the boiled mass which is fed into the press. The majority of the solids contained in the liquid are retained in the press and only a small proportion is discharged with the glue water and flows back via the strainer and the separators, and so on.

2. Or, into the drying apparatus, in which case it is advantageously at first well mixed with press-cake coming from the press.

The accompanying drawings illustrate one new arrangement of a known apparatus adapted to practice, in its preferred embodiment, the above described process.

Fig. 1 is a flow sheet of the operation of the process.

Fig. 2 is a cross-sectional view of a centrifugal bowl of known construction adapted to carry out the first above described centrifugation.

Fig. 3 is a cross-sectional view of a centrifugal bowl of known construction adapted to carry out the second above described centrifugation.

Referring to Fig. 1 of the drawings: 1 is a cooker for heating the raw material and has an outlet 2, with a valve 3, leading to the feed hopper 4 of a press 5 of the well known conical slatted body with a feed and pressure screw (not shown)

inside it. From the discharge end a spout 6 leads to a rotary drier 7.

Below the press 5 is a hopper 8 having a spout 9 leading to the inside of a rotary screen 10. Solids caught by the screen 10 are carried up to the top and fall into a hopper 11 with a discharge spout 12 while liquids, passing through the screen, fall into a hopper 13 with a pipe 14 leading to a centrifuge 15 having an oil outlet 16, a water outlet 17 and an outlet pipe 18 for mixed solids and water.

Pipe 18 leads to a second centrifuge 19 having a water outlet 20 and a sludge outlet 21 leading to a tank 22. A pipe 23 with a pump 24 leads from the sludge tank to a second inlet to the separator 19.

A spout 25 leads from tank 22 to an elevator 26 discharging into the hopper 4.

Referring to Fig. 2 of the drawings, 27 is the shell of a centrifugal bowl provided with a group of so-called separating discs 28 having distributing holes 28' and above it a so-called top disc 29 and a group of clarifying discs 30. A bottom disc 31 together with an upward extension 32 provides a receiving chamber which is fed by a feed tube 14. The top disc 29 has a neck with outlet holes 34. The bottom 35 has an extension 36 extending upward and outward inside the bowl shell, to a point adjacent its maximum diameter where there is a plurality of outlets 37, and leaves, between it and the shell, a passage 38 to which material may be fed by a pipe 39. 40 is a water outlet from the bowl shell.

Fig. 3 shows a centrifugal bowl having a shell 41, a bottom disc 42 with an upward extension 43 forming a receiving chamber fed by a tube 18, a set of clarifying discs 44, a bottom 45 with an upward and outward extension 46 terminating adjacent the maximum diameter of the shell where there is a plurality of discharge orifices 47 and leaving, between it and the shell, a passage 48 to which material may be fed by a pipe 23. 50 is a water outlet from the top of the bowl shell.

In operation, material, such as meat or fish refuse, etc., containing oil water and solids, is placed in the cooker 1, wherein it is heated until the solids break down so that the liquids can be easily pressed out. The mass is then allowed to flow through the pipe 2, valve 3, and hopper 4 into the press 5 where the liquids together with a considerable quantity of finer solids escape between the slats and fall into the hopper 8 while the relatively dry solids are forced out the end and fall into a rotary dryer 7.

From the hopper 8 the liquids, with the suspended fine solids, flow through the pipe 9 into the rotary screen 10 through which the liquids and finest solids pass into the hopper 13 while the coarser solids are caught, carried up toward the top of the screen, drop into a hopper 11 and pass out through spout 12. These coarser solids may, if desired, be conveyed to the elevator 26.

From the hopper 13 the liquids and finest solids pass through pipe 14 to the centrifuge 15 shown in Fig. 2. There it falls into the receiving chamber, passes outward below the bottom disc 31 to the distribution holes 28' through which it flows to the spaces between the discs 28 where the oil separates from the water and solids, passes up inside the neck of the top disc 29 and escapes through the holes 34 into a cover (not shown) discharging into the spout 16. The water and solids flow to the outside of the bowl where the coarser portion of the solids gathers while the water with the finest solids flows to the spaces between clarifying discs 30 through which the water alone flows to the outlet 40 and escapes into a cover (not shown) discharging into the water spout 17 while the solids first collect between the discs, then slide outward into the space around them and, mixed with the coarser solids previously collected there and considerable water, form a sludge which passes outward through outlets 37 into a cover (not shown) discharging into the spout 18.

If it is desired to practice the process in the simplest, but less desirable, of the two methods hereinbefore described, that is, if it is desired to secure final desired concentration of the sludge in a single centrifugal operation, such portion of the sludge discharged through outlets 37 into spout 18 may be returned through the pipe 39 and passage 38 to the space adjacent the outlets 37 that the total solids available approach the maximum quantity that can pass through the outlets 37.

It is, however, preferred, as hereinbefore stated, to practice the process in that embodiment thereof involving two successive centrifugal operations. In that method it is unnecessary, in the first centrifugal operation, although permissible, to return any part of the concentrate to the bowl. Preferably the entire mixture of water and solids (sludge) discharging into the spout 18 flows into a centrifuge 19 which, preferably, has a bowl 41, like that shown in Fig. 3, in which all the discs are clarifying discs. Here a large proportion of the water flows between the discs 44, leaving practically all of the solids behind it and escapes through outlets 50 into a cover (not shown) which discharges into the spout 20. The solids and remaining water collect as a sludge adjacent the outlets 47 and escape through them into a hopper (not shown) discharging into pipe 21 leading to tank 22.

Because the minimum size hole that will safely pass the largest particles of solids is large enough to pass several times the total quantity of solids, a large quantity of water escapes with them. To reduce the quantity of water escaping with the solids, enough of the sludge from tank 22 is returned by pump 24 through pipe 23 and space 48 to the vicinity of the orifices 47 to raise the total solids toward the maximum that can be discharged through the orifices.

The sludge not returned by pump 24 overflows through pipe 25 to the bottom of the elevator 26 which returns it to the hopper 4, whence it flows into the press 5 and the water is squeezed out.

Assuming that pipe 14 carries 10,000 lbs. of fluid per hour composed of 1% solids, 40% oil and 95% water and that centrifuge 15 separates out all the oil and produces a thin sludge containing 5% solids; the discharge from this centrifuge will then be 400 lbs. oil, 7,600 lbs. water, and 2,000 lbs. thin sludge containing 100 lbs. solids flowing to centrifuge 19.

Assuming that, by recirculation, the sludge in tank 22 has been built up to contain 25% solids. Then if we return 1600 lbs. per hour through pipe 23 to the centrifuge 19 the total feed to the centrifuge 19 will be—

2000 lbs.=100 lbs. solids+1900 water
 1600 lbs.=400 lbs. solids+1200 water
 3600 lbs.=500 lbs. solids+3100 water There will then be discharged from the outlets 50 and spout 20, 1600 lbs. of water and from the orifice 47, 2000 lbs. of sludge, consisting of 500 lbs. of solids plus 1500 lbs. of water, of which 1600 lbs. of sludge, consisting of 400 lbs. of solids plus 1200 lbs. of water, will be returned to the centrifuge through pipe 23, while 400 lbs. of sludge, consisting of 100 lbs. of solids plus 300 lbs. of water, will flow through the spout 25 to the elevator 26 and be returned to hopper 24.

As compared with the previously described methods, the present method has a not inconsiderable advantage, because the oil is practically completely separated from the solid matters in the first centrifugation, and meal obtained from the sludge at its concentration thereby being more nearly free from oil than that obtained, for instance, through gravity settling. It has also been found that the product obtained from the second separation, in dried state, has more valuable qualities than the normal fish-meal.

The greatest advantage is, however, that the process is a continuous one and that it is possible to avoid manual work because the concentrate of solids and glue water is discharged continuously and automatically mixed with the bulk of solids.

What I claim and desire to protect by Letters Patent is:

1. A process of separating oil and meal from animal raw material, which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-liquid, centrifuging the said mixture and thereby separating the oil from a mixture of glue water and solids, then centrifugally separating the last mentioned mixture into a sludge containing the solids and some glue water and a dilute phase containing the rest of the glue water, and in the latter operation introducing into the peripheral zone of the centrifuge an additional quantity of a concentrate containing a high percentage of such solids to thereby increase the concentration of solids in the sludge, discharging the said separated sludge and conveying sludge so separated and discharged to the material containing the bulk of the solids at a stage of the process subsequent to the heating step.

2. A process of separating oil and meal from animal raw material, which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-liquid, centrifuging the said mixture and thereby separating the oil from a mixture of glue water and solids, then centrifugally separating the last mentioned mixture into a sludge containing the solids and some glue water and a dilute phase containing the rest of the glue water, and in the latter operation introducing into the peripheral zone of the centrifuge an additional quantity of a concentrate containing a high percentage of such solids to thereby increase the concentration of solids in the sludge, discharging the said separated sludge and conveying sludge so separated and discharged to the material which is to be subjected to the pressing operation.

3. A process of separating oil and meal from animal raw material which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-liquid, centrifuging the said mixture and thereby separating the oil from a mixture of glue water and solids, then centrifugally separating the last mentioned mixture into a sludge containing the solids and some glue water and a dilute phase containing the rest of the glue water, and in the latter operation introducing into the peripheral zone of the centrifuge an additional quantity of a concentrate containing a high percentage of such solids to thereby increase the concentration of solids in the sludge, discharging the said separated sludge and then mixing sludge so separated and discharged with press-cake from the pressing operation.

4. A process of separating oil and meal from animal raw material, which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-cake, centrifuging the mixture and separating the oil from a sludge comprising a mixture of glue water and solids and in said operation introducing into the peripheral zone of the centrifuge a concentrate containing a high percentage of such solids to thereby increase the concentration of solids in the sludge, discharging the said separated sludge and reintroducing sludge so separated and discharged to the material containing the bulk of the solids at a stage of the process beyond the heating step.

5. A process of separating oil and meal from animal raw material, which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-cake, centrifuging the mixture and separating the oil from a sludge comprising a mixture of glue water and solids and in said operation introducing into the peripheral zone of the centrifuge a concentrate containing a high percentage of such solids to thereby increase the concentration of solids in the sludge, discharging the said separated sludge and reintroducing sludge so separated and discharged to the material which is to be subjected to the pressing operation.

6. A process of separating oil and meal from animal raw material, which comprises heating the material and subjecting it to pressure to obtain a press-cake and a press-liquid containing a minor proportion of the original solids, drying the press-cake, straining the press-liquid to remove therefrom the coarser solids which have not been retained in the press-cake and avoiding clogging of the strainer by retaining the finer solids in a mixture with the liquid constituents of the press-cake, centrifuging the mixture and separating the oil from a sludge comprising a mixture of glue water and solids and in said operation introducing into the peripheral zone of the centrifuge a concentrate containing a high percentage of such solids to thereby increase the concentration of solids in the sludge, discharging the said separated sludge and then mixing sludge so separated and discharged with press-cake from the pressing operation.

7. The process defined in claim 1 in which the concentrate containing a high percentage of solids that is introduced into the centrifuge, as specified, is a part of the sludge which is discharged from said centrifuge.

8. The process set forth in claim 4 in which the concentrate containing a high percentage of solids that is introduced into the centrifuge, as specified, is a part of the sludge which is discharged from said centrifuge.

TORE VERNER HANNO.